United States Patent [19]

Straub

[11] Patent Number: 5,169,417
[45] Date of Patent: Dec. 8, 1992

[54] DEVICE FOR REMOVING EXCESS SPRAYED MATERIAL DURING APPLICATION BY SPRAYING OF WET LACQUER

[76] Inventor: Hartwig Straub, Gansackerstr, D-6965 Berolzheim, Fed. Rep. of Germany

[21] Appl. No.: 656,100
[22] PCT Filed: Jul. 31, 1989
[86] PCT No.: PCT/DE89/00497
 § 371 Date: Apr. 23, 1991
 § 102(e) Date: Apr. 23, 1991
[87] PCT Pub. No.: WO90/01996
 PCT Pub. Date: Mar. 8, 1990

[30] Foreign Application Priority Data

Aug. 31, 1988 [DE] Fed. Rep. of Germany ....... 3829567

[51] Int. Cl.$^5$ .............................................. B05B 15/12
[52] U.S. Cl. ........................................ 55/259; 55/467; 55/472; 55/DIG. 46; 118/326; 118/DIG. 7; 454/50; 454/53
[58] Field of Search ................. 55/429, 472, 259, 302, 55/468, DIG. 46, 467, 471; 261/116, DIG. 75; 118/326, DIG. 7; 98/115.2; 454/50, 53

[56] References Cited

U.S. PATENT DOCUMENTS

| | | | |
|---|---|---|---|
| 3,906,756 | 9/1975 | Bone | 55/429 |
| 4,127,106 | 11/1978 | Jensen | 118/DIG. 7 |
| 4,181,093 | 1/1980 | Tredwell | 118/DIG. 7 |
| 4,303,417 | 12/1981 | Koch, II | 118/DIG. 7 |
| 4,358,433 | 11/1982 | Pircon | 261/116 X |

FOREIGN PATENT DOCUMENTS

| | | |
|---|---|---|
| 2620673 | 12/1977 | Fed. Rep. of Germany . |
| 3318043 | 11/1984 | Fed. Rep. of Germany .... 55/DIG. 46 |
| 3619674 | 12/1987 | Fed. Rep. of Germany . |

Primary Examiner—Richard L. Chiesa
Attorney, Agent, or Firm—Banner, Birch, McKie & Beckett

[57] ABSTRACT

A device for removing the excess sprayed material in a spraying operation (e.g., the spraying of wet lacquer or the like) includes a spraying booth, a suction booth and an aspirator. A partition provided with openings separates the spraying booth and the suction booth. The openings are defined as tapering nozzles so that the air and sprayed particles are passed through the nozzles at a high rate of speed. This construction minimizes the deposition of particles on the partition. Once in the suction chamber, the air flow is slowed so that the particles will dry. The aspirator is located in an upper region of the suction booth so that the particles are drawn upward. A filter is positioned in front of the aspirator to collect the dried particles. The particles thereby form filter cakes which are easily removed from the filter.

5 Claims, 1 Drawing Sheet

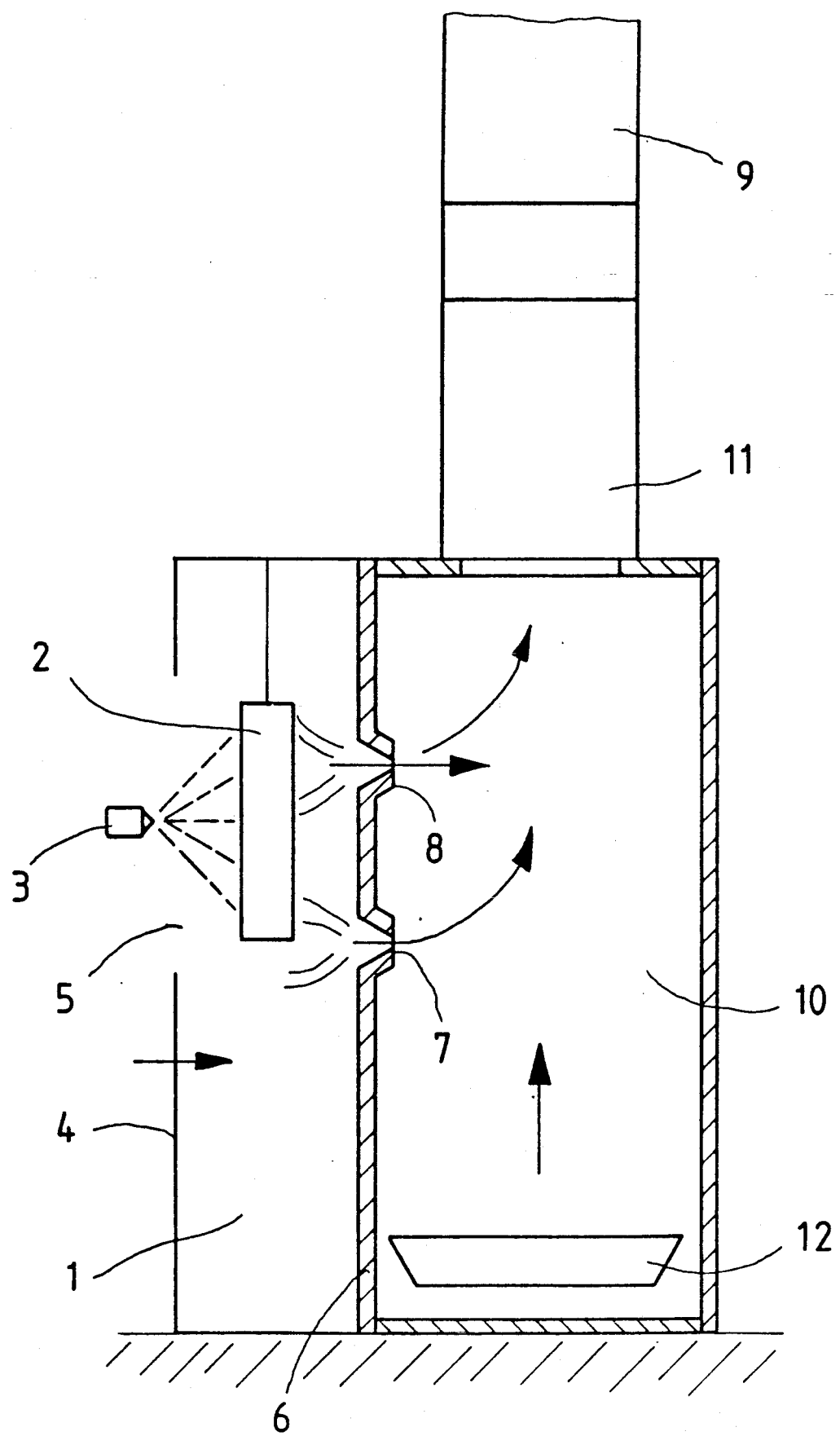

2

DEVICE FOR REMOVING EXCESS SPRAYED MATERIAL DURING APPLICATION BY SPRAYING OF WET LACQUER

BACKGROUND AND SUMMARY OF THE INVENTION

The invention relates to a device for removing excess sprayed material during application by spraying of wet lacquer according to the preamble of patent claim 1.

Such devices are described in the DE-AS 26 20 673 and DE-OS 36 19 674. In the known devices excess sprayed material is removed first along the partition by a film of water flowing down over the partition, carrying along sprayed particles to be removed, and fed to a water bath present at the bottom end of the suction booth. Thus, air freed almost completely of sprayed particles flows through the openings in the partition. In addition, there is an air flow directed closely over the surface of the water bath and located behind the partition, thus producing further removal of the sprayed particles.

The method of removing excess sprayed material of wet lacquer in which the sprayed particles are collected by water, causes significant environmental problems, since the sprayed particles must be removed from the water before it can be guided into local sewers.

The invention is based on the problem of accomplishing the removal of excess sprayed material of wet lacquer without the assistance of water in such a manner that the removed sprayed particles can be directly dumped and optionally recycled. The problem is solved by the invention with the features of the invention.

Since the nozzles in the partition taper in the direction of flow, the result is first of all an air flow of high velocity, due to which the sprayed particles are led past the nozzle walls so fast that they have a negligible tendency to settle on the partition or the nozzle walls. Thus these parts of the device remain largely free of excess sprayed material. In the suction booth it is provided with its cross section and its smooth booth walls that an upwardly directed air flow is produced by which the sprayed particles are carried for such a long period of time that they dry and thus assume a dust-like nature. This is achieved in that the upwardly directed air flow exhibits a higher speed than the sinking speed of the sprayed particles in stagnant air. The drying process of the sprayed particles extends with certainty also to those sprayed particles that enter into the suction booth through the uppermost nozzle area, since above this uppermost nozzle area for the sprayed particles owing to the corresponding length of the suction booth a dwell period persists in which the air flow still carries the sprayed particles for at least about 1 second, in which time the sprayed particles can certainly dry.

Preferably a cleanable filter, from which the filtered sprayed particles are thrown in known manner as filter cakes, e.g., by a compressed air jet directed against the air current, is installed in front of the aspirator. To collect sprayed particles cleaned thus, a collecting device is provided in the suction booth. The collected material can be disposed by said device, but it can also be fed again into the spraying process, to which end the sprayed particles must naturally be dissolved in a solvent.

For constructive reasons, the nozzles are designed preferably as slot nozzles extending over a significant portion of the partition. These slot nozzles can be arranged both vertically and horizontally or also in combination.

BRIEF DESCRIPTION OF THE DRAWINGS

The figure is a cross sectional view of one embodiment.

DETAILED DESCRIPTION OF THE PREFERRED EMBODIMENT

The figure shows the spraying booth 1 in which an object 2 to be coated with wet lacquer is suspended. At this object 2 a spray gun 3, which can be guided manually or automatically, is aimed. For accessibility to the interior of spraying booth 1 front wall 4 has opening 5, through which the object 2 to be sprayed is introduced into spraying booth 1. Instead of opening 5 in front wall 4 of the spraying booth, there can be a passage created by omitting front wall 4. On the rear wall the spraying booth 1 is defined by the vertical partition 6 in which two nozzles 7 and 8 are arranged here. These nozzles 7 and 8 taper off in the direction of the air flow indicated by arrows going through and generated by aspirator 9. Both nozzles 7 and 8 are designed here as horizontal slot nozzles.

Suction booth 10 in which owing to the effect of aspirator 9 the result is an upward directed air flow is attached to partition 6. Filter 11 to which aspirator 9 is connected is mounted on the upper end of suction booth 10. In the vicinity of the bottom of suction booth 10 there is the collecting device 12 for filtered sprayed particles to be cleaned by filter 11.

This device is based on the following function principle. Aspirator 9 sucks air into the spraying booth 1 through opening 5 (e.g. at 0.3–0.5 m/sec); said air then flows through nozzles 7 and 8 at a high speed (e.g. 8–12 m/sec.) into suction booth 10. Owing to the flow velocity of the air increasing in the area of nozzles 7 and 8, the excess sprayed particles that are carried along by the air exhibit a negligible tendency to settle on partition 6 and the walls of nozzles 7 and 8 so that excess sprayed material is sucked almost completely into suction booth 10. In suction booth 10 with almost smooth booth walls a flow velocity that is above the sinking velocity of the sprayed particles in stagnant air is produced owing to the cross section that is significantly greater than the total cross section of nozzles 7 and 8 (at least 10 times) so that the sprayed particles located in the suction booth are carried upward relatively slowly by the air flow. The suction booth 10 exhibits above the upper nozzle 8 such a length that the sprayed particles carried along by the air flow dwell in this region for at least about one second, a state that suffices to dry also the sprayed particles sucked in through nozzle 8. Thus, only sprayed particles that are deposited in the filter practically as dust get into filter 11. Preferably a known cleanable filter is used as the filter that is cleaned by a compressed air jet directed against the air flow, i.e., throws from its filter material the accumulated dry sprayed particles collected by the collecting device 12 as filter cakes. Then filter cakes obtained thus can be fed to any waste disposal by moving the collecting device (12) from suction booth 10. However, it can also be recycled for reuse by dissolving the sprayed particles contained in the filter cake in a solvent.

I claim:
1. A device for removing excess sprayed material during the application of spraying of wet lacquer com- prising a spraying booth, a suction booth and an aspirator, said suction booth separated from said spraying booth by a partition provided with air passages for directing a flow of air therethrough from the spraying booth to the suction booth, said air passages being defined as nozzles having converging walls wherein said air passages taper off in the direction of the flow of air so that the air flows through the nozzles at a high rate of speed to minimize the deposition of the excess sprayed material on the partition wall, said aspirator being arranged at generally an upper end of said suction booth and said suction booth being defined by smooth interior walls, said suction booth being dimensioned relative to said aspirator such that the excess sprayed material flowing into said suction booth is drawn upwards toward said aspirator, said length of said suction booth above the uppermost nozzle being sized so that substantially each particle of the excess sprayed material drawn into said suction booth stays in said booth at least approximately one second.

2. A device according to claim 1 further comprising a cleanable filter installed to precede the aspirator with respect to the flow of air.

3. A device according to claim 2 further comprising a collecting device in said suction booth for collecting the dry sprayed particles removed from the filter as filter cakes when the filter is cleaned.

4. A device according to claim 1, wherein the nozzles are designed as slot nozzles extending over a significant part of the partition.

5. A device for removing excess sprayed material during the application of spraying of wet lacquer comprising:
 a spray booth wherein the wet lacquer is sprayed onto an article;
 a suction booth adjacent the spray booth and including a partition separating the suction booth from said spray booth, said partition defining a plurality of nozzles through which air and the excess sprayed material is drawn from the spray booth and into the suction booth, each of the nozzles having converging walls to define a tapered configuration such that the size of the opening defined in each nozzle diminishes in the direction of the air flow so that the air and excess sprayed material are passed therethrough at a high rate of speed to thereby substantially avoid the depositing of the excess sprayed material on said partition, said suction booth further including generally smooth interior walls for defining a cavity into which the excess sprayed material is drawn, said cavity being sized so that said flow of air is slowed to permit the sprayed material to dry;
 an aspirator for drawing the air from the spraying booth to said suction booth, said aspirator being located generally in an upper region of said suction booth so that the excess sprayed particles in said suction booth are drawn upward; and
 a filter for removing the dried excess sprayed material from the air.

* * * * *